United States Patent
Hartmann et al.

(10) Patent No.: US 12,502,761 B2
(45) Date of Patent: Dec. 23, 2025

(54) SYSTEM, INTERFACE, POWER TOOL AND ENERGY SUPPLY DEVICE

(71) Applicant: Hilti Aktiengesellschaft, Schaan (LI)

(72) Inventors: Markus Hartmann, Mauerstetten (DE); Bernhard Liebert, Pfaffenhofen A.D. Glonn (DE); Stefan Schmid, Untermuehlhausen (DE); Markus Holubarsch, Landsberg am Lech (DE); Robert Stanger, Kaufbeuren (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/708,104

(22) PCT Filed: Nov. 14, 2022

(86) PCT No.: PCT/EP2022/081799
§ 371 (c)(1),
(2) Date: May 7, 2024

(87) PCT Pub. No.: WO2023/099184
PCT Pub. Date: Jun. 8, 2023

(65) Prior Publication Data
US 2024/0424658 A1    Dec. 26, 2024

(30) Foreign Application Priority Data
Dec. 1, 2021 (EP) .................. 21211566

(51) Int. Cl.
*B25F 5/02* (2006.01)
*H02J 7/00* (2006.01)

(52) U.S. Cl.
CPC .............. *B25F 5/02* (2013.01); *H02J 7/0044* (2013.01)

(58) Field of Classification Search
CPC ........................................ B25F 5/02
See application file for complete search history.

(56) References Cited

U.S. PATENT DOCUMENTS

| 4,794,273 A | 12/1988 | McCoullough et al. |
| 5,553,675 A * | 9/1996 | Pitzen ............ H02K 7/116 173/217 |

(Continued)

FOREIGN PATENT DOCUMENTS

| CN | 206689480 U | 12/2017 |
| CN | 210684352 U | 6/2020 |

(Continued)

*Primary Examiner* — Lucas E. A. Palmer
(74) *Attorney, Agent, or Firm* — Davidson Kappel LLC

(57) ABSTRACT

A system including a power tool and an energy supply device, wherein the power tool can be detachably connected to the energy supply device via an interface. The interface has a base material with a first density and is designed in such a way that the interface allows a relative movement of the power tool and the energy supply device in an insertion direction and prevents a relative movement between the power tool and the energy supply device in the other spatial directions. The energy supply device has a first contact region with a first contact material and the power tool has a second contact region with a second contact material, wherein the first contact material and/or the second contact material have a second density, wherein the second density is greater than the first density of the base material of the interface. An energy supply device, and to a corresponding interface is also provided.

22 Claims, 7 Drawing Sheets

(56) References Cited

U.S. PATENT DOCUMENTS

| | | | |
|---|---|---|---|
| 6,536,536 B1* | 3/2003 | Gass | B25F 5/021 |
| | | | 173/171 |
| 6,675,912 B2* | 1/2004 | Carrier | B25F 5/02 |
| | | | 173/217 |
| 7,119,516 B2 | 10/2006 | Denning et al. | |
| 7,900,524 B2 | 3/2011 | Calloway et al. | |
| 11,205,820 B2 | 12/2021 | Hanawa et al. | |
| 2003/0054230 A1* | 3/2003 | Al-Hallaj | H01M 10/6555 |
| | | | 429/50 |
| 2003/0174449 A1* | 9/2003 | Yamamoto | B25B 21/00 |
| | | | 361/23 |
| 2004/0146777 A1 | 7/2004 | Forlino et al. | |
| 2004/0175609 A1 | 9/2004 | Yageta et al. | |
| 2007/0210744 A1 | 9/2007 | Watson et al. | |
| 2008/0084181 A1 | 4/2008 | Griffin et al. | |
| 2008/0102684 A1 | 5/2008 | Matthias et al. | |
| 2008/0220324 A1* | 9/2008 | Phillips | H01M 10/4207 |
| | | | 29/623.1 |
| 2009/0108806 A1* | 4/2009 | Takano | H01M 10/482 |
| | | | 320/112 |
| 2009/0148755 A1 | 6/2009 | Heinzen et al. | |
| 2009/0269654 A1 | 10/2009 | Kairawicz et al. | |
| 2010/0176766 A1 | 7/2010 | Brandner et al. | |
| 2011/0147031 A1* | 6/2011 | Matthias | B25F 5/02 |
| | | | 173/171 |
| 2012/0040235 A1 | 2/2012 | Cho et al. | |
| 2012/0293096 A1 | 11/2012 | Mizoguchi et al. | |
| 2013/0031762 A1* | 2/2013 | Chellew | B25F 5/00 |
| | | | 173/217 |
| 2013/0278222 A1 | 10/2013 | Seiler et al. | |
| 2014/0087246 A1 | 3/2014 | Yamamoto et al. | |
| 2014/0131059 A1 | 5/2014 | Verbrugge et al. | |
| 2014/0147718 A1 | 5/2014 | Furui et al. | |
| 2014/0154535 A1* | 6/2014 | Olsson | H01M 10/613 |
| | | | 429/53 |
| 2014/0326477 A1 | 11/2014 | Thorson et al. | |
| 2015/0151423 A1 | 6/2015 | Burger et al. | |
| 2015/0214520 A1* | 7/2015 | Nishikawa | H01M 50/247 |
| | | | 429/100 |
| 2015/0357683 A1 | 12/2015 | Lohr et al. | |
| 2016/0072106 A1 | 3/2016 | Baumgartner et al. | |
| 2016/0072269 A1 | 3/2016 | Eschendal et al. | |
| 2016/0126533 A1 | 5/2016 | Velderman et al. | |
| 2016/0172641 A1* | 6/2016 | Zahn | B25F 5/02 |
| | | | 429/97 |
| 2017/0346324 A1 | 11/2017 | Hunger et al. | |
| 2017/0352847 A1 | 12/2017 | Klee et al. | |
| 2018/0069208 A1* | 3/2018 | Rejman | H01M 50/24 |
| 2018/0248418 A1 | 8/2018 | Walme et al. | |
| 2018/0366697 A1 | 12/2018 | Elfering et al. | |
| 2019/0259984 A1 | 8/2019 | Nishikawa et al. | |
| 2019/0259985 A1 | 8/2019 | Hanawa et al. | |
| 2019/0326716 A1 | 10/2019 | Nowalis et al. | |
| 2019/0334302 A1 | 10/2019 | Maier et al. | |
| 2020/0094329 A1 | 3/2020 | Meixner et al. | |
| 2020/0127339 A1 | 4/2020 | Nakano et al. | |
| 2020/0153142 A1 | 5/2020 | Meixner et al. | |
| 2020/0162007 A1 | 5/2020 | Sheeks et al. | |
| 2020/0215680 A1 | 7/2020 | Meixner et al. | |
| 2021/0246615 A1 | 8/2021 | Gaspard et al. | |
| 2021/0288373 A1* | 9/2021 | Varipatis | H01M 50/267 |
| 2022/0181813 A1 | 6/2022 | Meixner et al. | |
| 2022/0260440 A1 | 8/2022 | Goyal et al. | |
| 2022/0288764 A1 | 9/2022 | Hauser et al. | |

FOREIGN PATENT DOCUMENTS

| | | |
|---|---|---|
| CN | 111816818 A | 10/2020 |
| CN | 112 670723 | 4/2021 |
| DE | 202007014418 U1 | 12/2007 |
| DE | 102006050816 A1 | 4/2008 |
| DE | 102012209925 A1 | 12/2013 |
| DE | 21 2012 000140 U1 | 2/2014 |
| DE | 102013226232 A1 | 6/2014 |
| DE | 102013008829 A1 | 11/2014 |
| DE | 102014110073 A1 | 1/2016 |
| DE | 10 2014 217987 A1 | 3/2016 |
| DE | 10 2015 110308 A1 | 9/2016 |
| DE | 102016203431 A1 | 9/2016 |
| DE | 102016209965 A1 | 12/2017 |
| DE | 10 2016 120329 A1 | 4/2018 |
| DE | 102017217495 A1 | 4/2019 |
| DE | 102017217503 A1 | 4/2019 |
| EP | 2178135 A1 | 4/2010 |
| EP | 2416407 A1 | 2/2012 |
| EP | 2207249 B1 | 7/2015 |
| EP | 3035484 A1 | 6/2016 |
| EP | 3340364 A1 | 6/2018 |
| EP | 3392974 A1 | 10/2018 |
| EP | 3395505 A1 | 10/2018 |
| EP | 3014690 B1 | 3/2020 |
| EP | 3 651227 A1 | 5/2020 |
| EP | 3653340 A1 | 5/2020 |
| EP | 3756831 A1 | 12/2020 |
| EP | 3834992 A1 | 6/2021 |
| GB | 2431433 A | 4/2007 |
| JP | 2007105816 A | 4/2007 |
| WO | WO 2011051174 A1 | 5/2011 |
| WO | WO 2012084394 A1 | 6/2012 |
| WO | WO2016170476 A1 | 10/2016 |
| WO | WO 2019030030 A1 | 2/2019 |
| WO | WO2020247326 A1 | 12/2020 |
| WO | WO2021108118 A1 | 6/2021 |
| WO | WO2019243756 A1 | 8/2021 |
| WO | WO 2023/099146 A1 | 6/2023 |
| WO | WO2023/099155 A1 | 6/2023 |
| WO | WO2023/099163 A1 | 6/2023 |
| WO | WO2023/099165 A1 | 6/2023 |
| WO | WO2023/099184 A1 | 6/2023 |
| WO | WO2023/099186 A1 | 6/2023 |
| WO | WO2023/099195 A1 | 6/2023 |
| WO | WO 2023/099196 A1 | 6/2023 |
| WO | WO 2023/099198 A1 | 6/2023 |
| WO | WO2023/099202 A2 | 6/2023 |
| WO | WO2023/099203 A1 | 6/2023 |
| WO | WO2023/099653 A1 | 6/2023 |
| WO | WO2023099149 A1 | 6/2023 |
| WO | WO2023099156 A1 | 6/2023 |
| WO | WO2023099168 A1 | 6/2023 |
| WO | WO2023099169 A1 | 6/2023 |
| WO | WO2023099181 A1 | 6/2023 |
| WO | WO2023099182 A1 | 6/2023 |
| WO | WO2023099183 A1 | 6/2023 |
| WO | WO2023099194 A1 | 6/2023 |
| WO | WO2023099197 A1 | 6/2023 |
| WO | WO2023099199 A1 | 6/2023 |

* cited by examiner

SYSTEM, INTERFACE, POWER TOOL AND ENERGY SUPPLY DEVICE

The present invention relates to a system comprising a power tool and an energy supply device, wherein the power tool can be detachably connected to the energy supply device via an interface. In further aspects, the invention relates to a power tool, to an energy supply device, and to a corresponding interface.

BACKGROUND OF THE INVENTION

The invention is located in the field of interfaces for rechargeable energy supply devices. In particular, energy supply devices for power tools are generally designed in such a way that the energy supply devices can be stored in a charging station for charging. While the energy supply device is being charged, the user can continue to operate the power tool with a further energy supply device and thus achieve work progress.

SUMMARY OF THE INVENTION

The energy supply device can be connected to the power tool via an interface if the energy supply device is intended to supply the power tool with electrical power during its operation. In this working mode, the energy supply device should be held and fastened securely and stably in the power tool, wherein it would be desirable for the fastening also to withstand shocks and vibrations such as can occur on construction sites.

The interface with which the energy supply device is connected to the power tool plays an important role. This interface should on the one hand be of a particularly robust design and have high wear resistance. On the other hand, it should also have a low weight and be able to be produced inexpensively by a mass production method.

An object of the present invention is to provide an interface for connecting an energy supply device to a power tool that is particularly robust to wear and is durable. The invention is further concerned with providing a power tool, an energy supply device and a system comprising a power tool and an energy supply device, with which a robust and durable connection between the energy supply device and the power tool can be made possible and which also withstands a large number of insertion operations, as well as the demanding operation of the system.

According to the invention there is provided a system comprising a power tool and an energy supply device, wherein the power tool can be detachably connected to the energy supply device via an interface. The system is characterized in that the interface comprises a base material with a first density and is designed in such a way that the interface allows a relative movement of the power tool and the energy supply device in an insertion direction. The energy supply device has a first contact region with a first contact material and the power tool has a second contact region with a second contact material, wherein, in an inserted state, the first contact region is in contact with the second contact region in such a way that a relative movement between the power tool and the energy supply device in the other spatial directions is prevented. The first contact material and/or the second contact material have a second density, wherein the second density is greater than the first density of the base material of the interface. It has been found that, with the invention, it is possible to provide a particularly robust interface for connecting an energy supply device to a power tool, which advantageously withstands the high mechanical and electrical loads which can occur during operation of a powerful power tool and/or a powerful energy supply device.

In the context of the invention, it is preferred that the interface is formed by the contact regions of the system components "power tool" and "energy supply device". The interface preferably allows linear guiding of the energy supply device in a cavity of the power tool or in an outer region of the power tool. For example, the energy supply device can be fastened to an underside of the power tool if the power tool is to be supplied with electrical power by the energy supply device. In the context of the invention, the system components "power tool" and "energy supply device" are preferably also referred to as "connecting partners of the interface". If the base material and the contact material of the contact region of the power tool and/or of the energy supply device differ in terms of their density, there are preferably two different materials in the region of the interface. The interface then preferably constitutes a "hybrid linear guide". Because they are constructed from the at least two materials mentioned, the contact regions of the interface at the power tool and/or at the energy supply device can preferably also be referred to as a "hybrid linear guide" or as a "linear guide of hybrid design".

It has been found that, by using the two materials with different densities, a particularly robust, wear-resistant and durable interface for connecting an energy supply device to a power tool can be provided. The interface thereby meets increased wear requirements which could be made of the connection of the energy supply device and the power tool in future—for example due to new battery technologies. This is because new battery technologies are expected to produce energy supply devices having longer service lives. For this case, it is advantageous if the interfaces for connecting an energy supply device to a power tool are also able to match these longer service lives without having to be replaced before the end of the life of the energy supply device. Advantageously, the invention makes it possible to provide a technical solution for connecting an energy supply device to a power tool which both has high wear resistance and is capable of ensuring high security against undesirable loosening of the interface. Tests have shown that the system, in which at least one contact region has a contact material with a density that is different from, preferably higher than, that of the base material, advantageously meets these objectives.

In the context of the invention, it is preferred that the power tool and the energy supply device have in the region of the interface a base material that preferably has a first density. The base material may be, for example, a plastics material. In the context of the invention, the wording according to which "the interface comprises a base material with a first density" is preferably to be understood in such a way that both the power tool and the energy supply device can comprise in the region of the interface a base material with a first density. The energy supply device has in the region of the interface a first contact region comprising a first contact material. In a first exemplary embodiment of the invention, this first contact material can correspond to the base material and have a substantially identical or similar density to the base material. In a second exemplary embodiment of the invention, the first contact material can be another material that is different from the base material and has a second density. In the context of the invention, it is very particularly preferred that the contact material having a second density comprises a metal, a metal alloy and/or a metal coating as the contact material or is formed therefrom. In this case, the base material of the energy supply device can have depressions and/or recesses in the region of the interface, wherein the depressions and/or recesses are configured to receive inserts and/or insert parts of a contact material with a second density. In the context of the invention, it is very particularly preferred that the inserts and/or insert parts comprise a metal, a metal alloy and/or a metal coating. In the context of the invention, it is preferred that the inserts and/or insert parts of metal in this second exemplary embodiment of the invention form the first contact region of the energy supply device.

In the context of the invention, it can be preferred that, for producing the inserts or the insert parts, sheet-metal parts are placed into an injection molding tool and overmolded with a material of lower density. The material of lower density can preferably be the base material of the interface, that is to say preferably a plastics material. In the context of the invention, it can also be preferred that both the power tool and the energy supply device comprise a base material, wherein the base materials of the power tool and/or of the energy supply device can differ slightly from one another. In the context of the invention, it is preferred that minor differences in the base materials of the connecting partners of the interface are not considered to be materials with different densities. In the context of the invention, minor differences, for example in the composition of the base material if it is, for example, a plastics material, are also considered to be base materials with a first density, wherein the first density is preferably lower than a second density of the first or of the second contact material. The first density, that is to say the density of the base material, may preferably lie in a region of less than 3.0 g/cm$^3$, preferably less than 2 g/cm$^3$, while the second density lies in a region of greater than 3.0 g/cm$^3$, preferably greater than 4 g/cm$^3$.

The power tool has in the region of the interface a second contact region comprising a second contact material. In a further exemplary embodiment of the invention, this second contact material can correspond to the base material and have a substantially identical or similar density to the base material. In yet a further exemplary embodiment of the invention, the second contact material can be another material that is different from the base material and has a second density. In the context of the invention, it is very particularly preferred that the contact material having a second density comprises a metal, a metal alloy and/or a metal coating as the contact material or is formed therefrom. In this case, the base material of the power tool can have depressions and/or recesses in the region of the interface, wherein the depressions and/or recesses are configured to receive inserts and/or insert parts of a contact material with a second density. In the context of the invention, it is very particularly preferred that the inserts and/or insert parts comprise a metal, a metal alloy and/or a metal coating. In the context of the invention, it is preferred that the inserts and/or insert parts of metal in this further exemplary embodiment of the invention form the second contact region of the power tool.

Thus, in the region of the interface, when connection has been made, a first contact material of the energy supply device meets a second contact material of the power tool, wherein at least one of the contact materials has a second density, that is to say is formed, for example, by inserts and/or insert parts of metal. The wear resistance and robustness of the interface as a whole can thereby be substantially increased, since a wear-resistant material is used in particular in the contact regions which are subjected to particularly high mechanical loads. Advantageously, a particularly robust, durable and low-wear interface for connecting the energy supply device to the power tool can thereby be provided.

For example, inserts or insert parts of metal or a metal alloy can be used as the contact material with a second density and can be inserted into depressions within the base material of one of the connecting partners of the interface. The inserts or insert parts of metal or a metal alloy can, for example, be manufactured from a sheet metal or comprise sheet metal, wherein in the context of the invention the term "sheet metal" is preferably understood as meaning "rolling-mill product comprising metal or a metal alloy". The high density of the contact material preferably results in the high wear resistance in the contact region of the locking element and thus advantageously in a longer service life of the interface comprising such a locking element. The metals used may be, for example, nickel (Ni). In the context of the invention, it is preferred that the contact materials with a second density have a PREN value of greater than 10, wherein the PREN value preferably lies in a region of 13 or greater than 15. The abbreviation PREN preferably stands for the pitting resistance equivalence number and is a measure of the corrosion resistance of a material.

If the energy supply device is to be connected to the power tool in order to supply the power tool with electrical power, the energy supply device can be inserted into a cavity in the power tool, for example. In the context of the invention, it may also be preferred that the energy supply device can be inserted into a receiving device of the power tool, wherein the receiving device is arranged, for example, on an underside of the power tool. In the context of the invention, it may in particular be preferred that the energy supply device is fastened to an underside or a side wall of the power tool. If the power tool has a cavity for receiving the energy supply device, this cavity is preferably substantially cuboid, wherein one side of the cavity is usually open. This open side of the cavity may preferably be referred to as "the rear side of the cavity". In addition to the open side, the preferably shaft-like cavity can have a top side, an underside, a front side and two side walls. Preferably the top side and the underside, the two side walls and the front side and the open side of the cavity are on opposite sides of the cavity, i.e. the sides mentioned are each opposite one other. The open side of the cavity is preferably the insertion opening for the energy supply device. This means that the energy supply device can be introduced through said insertion opening into the power tool or into the cavity provided for it.

In addition to the advantageous material properties, the proposed system or the proposed interface also has advantageous mechanical properties. The interface is advantageously designed in such a way that it allows a relative movement of the power tool and the energy supply device in an insertion direction and prevents a relative movement between the power tool and the energy supply device in the other spatial directions. A virtual coordinate system can be used to describe the present invention, in which an insertion direction of the interface preferably coincides with the first spatial axis of the virtual coordinate system. It is preferred in the context of the invention that a second axis of the virtual coordinate system extends between an underside and a top side of the cavity of the power tool for receiving the energy supply device, while a third axis of the virtual coordinate system extends between the side surfaces of the receiving shaft for the energy supply device. As viewed in relation to the energy supply device, the first spatial axis preferably extends between the front side of the energy supply device and the rear side of the energy supply device, wherein the energy supply device can be introduced with its front side first into a cavity of the power tool. In relation to the energy supply device, the second spatial axis of the virtual coordinate system extends between a top side and an underside of the energy supply device, while the third spatial axis of the virtual coordinate system extends between the side surfaces of the energy supply device. The axes of the virtual coordinate system are preferably perpendicular to one another, wherein the first axis corresponds to the x-axis of a known coordinate system (forward and back), the second axis corresponds to the y-axis (up and down), and the third axis corresponds to the z-axis (out of and back into the image plane). Within the meaning of the virtual coordinate system, a front side of the cavity of the power tool in the insertion direction coincides with a front region of the energy supply device, because the front side of the cavity is the target, as it were, of the insertion movement. By contrast, the open side of the cavity preferably coincides with the rear side of the cavity. In particular, in the context of the present invention, an insertion direction can be defined which corresponds to the direction in which the energy supply device is introduced into the power tool. This means that the insertion direction extends, starting from the insertion opening, in the direction of the front side of the preferably shaft-like cavity of the power tool. This insertion direction preferably coincides with a first axis of a virtual coordinate system which is used to describe the invention (cf. figures).

In the context of the invention, it is preferred that the side walls and side surfaces of the energy supply device are designed to correspond to the walls of the cavity of the power tool. In the context of the invention, the corresponding design of the side walls and side surfaces of the energy supply device on the one hand and of the walls of the cavity of the power tool on the other hand preferably means that the walls in each case have substantially planar surfaces, so that the energy supply device can be introduced particularly easily and securely into the cavity of the power tool. In particular, the side walls and side surfaces of the energy supply device and the walls of the cavity of the power tool do not have protruding regions or elements which could constitute an obstacle on insertion of the energy supply device into the power tool.

The energy supply device preferably has a cuboidal basic shape, wherein the energy supply device has in particular a top side and an underside, a front side and a rear side, and two side surfaces. In the context of the invention, it is preferred to refer to the state in which the energy supply device is inserted in the cavity or on the holding device of the power tool as an "introduced" or "inserted" state. In this state, it is preferably not necessary that the energy supply device is already locked. Rather, in the context of the invention, it is preferred that in the introduced state the energy supply device is still able to move in or on the power tool, at least in the insertion direction. In the context of the invention, this ability of the energy supply device to move in relation to the power tool in the insertion direction is made possible in that the interface between the power tool and the energy supply device is designed in such a way that it allows a relative movement of the power tool and the energy supply device in an insertion direction. In the language of the virtual coordinate system, the energy supply device can thus preferably be moved to and fro or forward and back in the first spatial direction.

The interface is additionally configured to prevent a relative movement between the power tool and the energy supply device in the other spatial directions. In the context of the invention, the "other spatial directions" are preferably defined by the second spatial axis and the third spatial axis. Advantageously, the interface does not allow a movement of the energy supply device in relation to the power tool, or prevents such a movement. As a result, the energy supply device can be introduced into or fastened to the power tool particularly securely, stably and without damage, without the occurrence of undesirable relative movements in the other spatial directions, that is to say relative movements in spatial directions that preferably coincide with the second and third spatial axes of the virtual coordinate system. By the combination of the advantageous material properties with the advantageous mechanical properties just described, the invention can be used to provide a particularly robust, durable and low-wear interface for connecting the energy supply device to the power tool, wherein the at least one of the contact regions that are subjected to particularly high mechanical loads has a particularly wear-resistant material, and the interface allows a relative movement between the power tool and the energy supply device in an insertion direction and blocks such a movement in other spatial directions.

The state in which the energy supply device and the power tool are present separately from one another is referred to as a "disconnected" or "separate" state in the context of the invention. In this disconnected or separate state, the energy supply device can be connected to a charger, for example, in order to be charged.

The energy supply device can have on its top side in the front region those elements and components that allow electrical power to be transmitted from the energy supply device to the power tool. In addition, means for data exchange between the energy supply device and the power tool can be provided. These can preferably be power and/or data contacts, which may be spring-mounted, for example. The spring mounting may be arranged, for example, in the region of the energy supply device and/or in the region of the power tool. After insertion of the energy supply device has been completed, the power and/or data contacts come into operative connection with corresponding contacts of the power tool such that a current flow and/or data exchange can be ensured.

It is preferred in the context of the invention that the second density lies in a region of greater than 3.0 g/cm$^3$, preferably greater than 4 g/cm$^3$. The materials that are suitable for forming the contact region may be, for example, metals or metal alloys. In other words, the contact material having a second density may be a metal, a metal alloy and/or a metal coating. The metals or metal alloys that are used advantageously have particularly good wear resistance, so that a robust and durable interface can be provided which withstands a large number of operations of inserting the energy supply device into the power tool. Tests have shown that the interface in particular also withstands the high mechanical and electrical demands during operation of the power tool. Consequently, the invention ensures a long running time in the power tool under vibration loads.

It is preferred in the context of the invention that a surface hardness of the contact material having a second density lies in a region of greater than 90 HV, preferably in a region of greater than 100 HV, wherein the unit "HV" preferably stands for a hardness test of the contact material according to Vickers. Tests have shown that especially contact materials with a Vickers hardness of greater than 100 HV can lead to particularly wear-resistant and robust interfaces and locking elements.

It is preferred in the context of the invention that the first density, that is to say the density of the base material, lies in a region of less than 3.0 g/cm³, preferably less than 2 g/cm³. The materials that are suitable for the base material may be, for example, plastics materials. The low density of the base material advantageously has the result that a particularly lightweight interface for connecting the energy supply device to the power tool can be provided. In addition, materials with a density of less than 2 g/cm³ represent particularly inexpensive solutions for the production of the interface or of the locking element.

It is preferred in the context of the invention that the contact region having the contact material with the second density accounts for a proportion of greater than 5% of a guide surface between the power tool and the energy supply device. Preferably, the particularly wear-resistant material, which preferably corresponds to the contact material with the second density, can account for a proportion of greater than 5% of a total guide surface of the interface. The mentioned proportion of the wear-resistant material advantageously further contributes to the robustness and durability of the interface between the energy supply device and the power tool.

It is preferred in the context of the invention that the energy supply device has a first interface body and the power tool has a second interface body, wherein a proportion of the contact material having a second density in the first interface body and/or in the second interface body is less than 10%. The interface bodies preferably constitute those regions and portions of the energy supply device and of the power tool that are relevant or effective for forming the interface or for forming the connection between the system components. Possible configurations of the interface bodies are shown in the figures. It is preferred in the context of the invention that the wear-resistant material, which preferably corresponds to the contact material with the second density, accounts for a proportion of less than 10% of the interface body of the energy supply device and/or of the power tool. If, for example, the power tool has a contact material with a second density, then the proportion of this contact material with the second density in the interface body of the power tool is preferably less than 10%. If, by contrast, the energy supply device has a contact material with a second density, then the proportion of this contact material with the second density in the interface body of the energy supply device is preferably less than 10%. It may also be preferred in the context of the invention that both the power tool and the energy supply device have a contact material with a second density. In this case, it is preferred in the context of the invention that the proportion of this particularly wear-resistant material in the respective interface body is less than 10%. In this way, the invention can be used to provide a particularly lightweight interface and particularly lightweight power tools and energy supply devices.

The invention relates also to a system according to the present invention, wherein the system comprises a second energy supply device, wherein the power tool can be detachably connected both to the first energy supply device and to the second energy supply device via an interface in order to receive electrical power from the respective connected energy supply device. In the system with the two energy supply devices, the interface comprises a base material with a first density and is designed in such a way that the interface allows a relative movement of the power tool and the energy supply devices in an insertion direction, wherein the second energy supply device has a third contact region with a third contact material, wherein, in an inserted state, the third contact region is in contact with the second contact region in such a way that a relative movement between the power tool and the energy supply device in the other spatial directions is prevented, wherein the third contact material has the first density.

It is preferred in the context of the invention that the contact region of the second energy supply device has a contact material which corresponds to the base material of the interface, wherein the base material may be, for example, a plastics material. The second energy supply device has in the region of the interface a third contact region which comprises a third contact material. In a first exemplary embodiment of the invention, this first contact material can correspond to the base material and have a substantially identical or similar density to the base material.

In the context of the invention, the power tool can be supplied with electrical power both by a first type of energy supply device and by a second type of energy supply device, wherein the first energy supply device is preferably a representative of the "first type of energy supply device", while the second energy supply device is preferably a representative of the "second type of energy supply device". It is preferred in this refinement of the invention that the first energy supply device has a contact region with a contact material of the second density, while the second energy supply device has a contact region with a contact material of the first density, wherein this contact material preferably corresponds to the base material of the interface. In the context of the invention, this preferably means that the power tool can be supplied with electrical power both by an energy supply device with a particularly wear-resistant interface region ("first energy supply device") and by an energy supply device with a lower density which preferably corresponds to the first density ("second energy supply device"). It is preferred in the context of the invention that the energy supply device with the contact material of the second density, that is to say the first energy supply device, is a particularly powerful energy supply device which is configured to supply particularly powerful power tools with electrical power. It may be preferred in the context of the invention that the energy supply device with the contact material of the first density, that is to say the second energy supply device, is a less powerful energy supply device which is configured to supply smaller power tools with electrical power.

The proposed system can of course also comprise more than one power tool and more than two energy supply devices. At least one energy supply device of the system preferably has a contact material with a first density, while at least one other energy supply device of the system has a contact material with a second density. The power tool can have a contact material of the first or of the second density. In a particularly preferred exemplary embodiment of the invention, the system can comprise at least two power tools and at least two energy supply devices. The power tools may be, for example, a storage-battery-operated screwdriver which, owing to the operations typically performed using a storage-battery-operated screwdriver, has a lower service life requirement than, for example, a hammer drill. The hammer drill can, for example, be the second power tool in the exemplary embodiment of the system, wherein a hammer drill, owing to the operations typically performed using a hammer drill, has a particularly high service life requirement. For example, the storage-battery-operated screwdriver may have in its contact region a contact material of the first density, that is to say, for example, a plastics material. The storage-battery-operated screwdriver can preferably be connected to an energy supply device of the first type, wherein the energy supply device of the first type has in its contact region preferably a contact material of the second density, that is to say a wear-resistant contact material. In this combination-storage-battery-operated screwdriver, that is to say power tool with a low service life requirement, and energy supply device of the first type, that is to say particularly powerful energy supply device—the interface can comprise a material combination plastics material (contact material with a first density, on the power tool side) and metal (contact material with a second density, on the energy supply device side). Alternatively, the storage-battery-operated screwdriver can be connected to an energy supply device of the second type, that is to say a less powerful energy supply device, wherein the energy supply device of the second type preferably has in its contact region a contact material of the first density. In this combination—storage-battery-operated screwdriver, that is to say power tool with a low service life requirement, and energy supply device of the second type, that is to say a less powerful energy supply device—the interface can comprise a material combination plastics material (contact material with a first density, on the power tool side) and plastics material (contact material with a first density, on the energy supply device side).

In this exemplary embodiment of the invention, the second power tool can be a hammer drill with a particularly high service life requirement. The contact material in the contact region of the hammer drill can preferably be a contact material of the second density, that is to say a particularly wear-resistant material. The hammer drill can preferably be connected to an energy supply device of the first type, wherein the energy supply device of the first type has in its contact region preferably a contact material of the second density, that is to say a wear-resistant contact material. In this combination-hammer drill, that is to say power tool with a high service life requirement, and energy supply device of the first type, that is to say particularly powerful energy supply device—the interface can comprise a material combination metal (contact material with a second density, on the power tool side) and metal (contact material with a second density, on the energy supply device side). Alternatively, the hammer drill can be connected to an energy supply device of the second type, that is to say a less powerful energy supply device, wherein the energy supply device of the second type preferably has in its contact region a contact material of the first density. In this combination-hammer drill, that is to say power tool with a particularly high service life requirement, and energy supply device of the second type, that is to say a less powerful energy supply device—the interface can comprise a material combination metal (contact material with a second density, on the power tool side) and plastics material (contact material with a first density, on the energy supply device side).

In this exemplary embodiment of the invention, the second power tool can be a hammer drill with a particularly high service life requirement. The contact material in the contact region of the hammer drill can preferably be a contact material of the second density, that is to say a particularly wear-resistant material. The hammer drill can preferably be connected to an energy supply device of the first type, wherein the energy supply device of the first type has in its contact region preferably a contact material of the second density, that is to say a wear-resistant contact material. In this combination-hammer drill, that is to say power tool with a high service life requirement, and energy supply device of the first type, that is to say particularly powerful energy supply device—the interface can comprise a material combination metal (contact material with a second density, on the power tool side) and metal (contact material with a second density, on the energy supply device side). Alternatively, the hammer drill can be connected to an energy supply device of the second type, that is to say a less powerful energy supply device, wherein the energy supply device of the second type preferably has in its contact region a contact material of the first density. In this combination-hammer drill, that is to say power tool with a particularly high service life requirement, and energy supply device of the second type, that is to say a less powerful energy supply device—the interface can comprise a material combination metal (contact material with a second density, on the power tool side) and plastics material (contact material with a first density, on the energy supply device side).

In other words, in the case of the energy supply device of the second type, there is preferably no difference between the contact material of the energy supply device and the base material of the interface. The connection between the power tool and the energy supply device of the second type is preferably a connection between a power tool and a conventional energy supply device, wherein the connection between the power tool and the energy supply device of the first type is a connection between an energy supply device modified in accordance with the invention and a power tool. It is preferred in the context of the invention that the proposed power tool and the various energy supply devices form a system, wherein the power tool can be supplied with electrical power by energy supply devices both of the first type and of the second type. A particularly flexible system for supplying energy to a power tool can thereby be provided, wherein the power tool can advantageously be supplied with electrical power by energy supply devices of the first and/or of the second type. The energy supply devices can differ, for example, by their capacity, their output current or their voltage, wherein other electrical quantities are of course also suitable as distinguishing features. For example, energy supply devices with a low capacity can be used to supply energy to the power tool, wherein these energy supply devices are energy supply devices of the second type, for example, and have a contact material with a first density. In addition, however, energy supply devices with a high capacity can also be used to supply energy to the power tool. These energy supply devices can have a contact material with a second density, for example, and are energy supply devices of the first type. With the invention, the power tool is particularly suitable for the transition to new and improved battery technologies. If the new and improved energy supply devices have, for example, hybrid linear guides according to the invention, they can be used together with the power tool. In addition, however, conventional energy supply devices with older battery technologies can be used in the power tool for energy supply. Moreover, power tools with a low service life requirement can have a contact material with a first density, and power tools with high service life requirements can have an interface material of a second density, as described in the above exemplary embodiment.

In a second aspect, the invention relates to an interface for detachably connecting an energy supply device to a power tool, wherein the energy supply device and the power tool are connecting partners of the interface. The interface is characterized in that the interface has a base material with a first density and is designed in such a way that the interface allows a relative movement of the connecting partners in an insertion direction, wherein one of the connecting partners has a first contact region which is in contact with a second contact region of the other connecting partner in such a way that a relative movement of the connecting partners in the other spatial directions is prevented, wherein the first contact region has a first contact material and the second contact region has a second contact material, wherein the first contact material and/or the second contact material have a second density. The advantages, technical effects and definitions which have been described for the system preferably apply also to the interface, as well as to the energy supply device and the power tool which are described in the following text.

In a further aspect, the invention relates to a power tool, wherein the power tool has a second contact region for detachably connecting the power tool to an energy supply device, wherein the second contact region has a second contact material with a second density, wherein the second contact region is configured to allow a relative movement of the power tool and the energy supply device in an insertion direction and to prevent a relative movement between the power tool and the energy supply device in the other spatial directions. In the context of the invention, it is preferred that the power tool can be used in the system.

In a further aspect, the invention relates to an energy supply device which is designed for supplying a power tool with electrical power with the power tool, wherein the energy supply device has a first contact region for detachably connecting the energy supply device to a power tool, wherein the first contact region has a first contact material with a second density, wherein the first contact region is configured to allow a relative movement of the power tool and the energy supply device in an insertion direction and to prevent a relative movement between the power tool and the energy supply device in the other spatial directions. Tests have shown that, with the invention, a robust and durable energy supply device can be provided. In the context of the invention, it is preferred that the energy supply device can be used in the system.

The energy supply device may, for example, be based on the new and improved battery technologies and have a service life of at least 600 charging cycles. This preferably corresponds to a capacity throughput of at least 100 Ah/cm$^3$ (capacity/cell volume) with a simultaneous loss of capacity of less than 30%. If such an energy supply device is used to supply a power tool with electrical power, the interface can be used to carry out more than the hitherto conventional 2500 plug-in or connection cycles between the energy supply device and the power tool without significant wear occurring at the interface. The invention therefore particularly readily meets the future requirements for interfaces that result from the new and improved battery technologies, and particularly robust, powerful, and wear-resistant interfaces for connecting an energy supply device to a power tool can advantageously be provided.

Thus, the invention is able to ensure both high wear resistance and high security against loosening due to acceleration forces without increasing the actuating force when manually loosening the interface. Such energy supply devices can preferably have a capacity throughput of at least 100 Ah/cm$^3$ (capacity/cell volume) with a simultaneous loss of capacity of less than 30%. The platform concept additionally permits a joint use of interfaces with different contact materials, and the use of hybrid linear guides. It is thus possible, advantageously without changing the interface of the other connecting partner, to use the more cost-intensive hybrid linear guides in particular in the energy supply devices which have a high lifetime capacity density. In energy supply devices which have a lower lifetime capacity density, less cost-intensive interfaces with contact materials with a first density can advantageously be used.

Advantageously, the more cost-intensive hybrid linear guides can be used in particular in power tools that have a high service life requirement, preferably without substantially changing the interface of the other connecting partner. In addition, power tools which have a lower service life requirement can advantageously be equipped with a less cost-intensive interface with contact materials of a first density.

The improvements in terms of robustness and service life are particularly advantageous because it is becoming apparent that the service lives of rechargeable batteries could be extended because of improved battery technologies. It will therefore be welcomed by experts if the present invention can be used to provide an interface solution for an energy supply device, in particular for connection to a power tool, which does justice to the longer service life of the future energy supply device.

It is preferred in the context of the invention that the energy supply device comprises at least one energy storage cell, which is referred to as "cell" in the context of the invention. The at least one cell has an internal resistance DCR_I of less than 10 milliohms (mohm). In preferred embodiments of the invention, the internal resistance DCR_I of the at least one cell may be less than 8 milliohms and preferably less than 6 milliohms. Here, the internal resistance DCR_I is preferably measured in accordance with standard IEC61960. The internal resistance DCR_I represents, in particular, the resistance of a cell of the energy supply device, wherein any components or accessories of the cell do not make any contribution to the internal resistance DCR_I. A low internal resistance DCR_I is advantageous, as this means that unwanted heat that needs to be dissipated does not arise at all. The internal resistance DCR_I is, in particular, a DC resistance which can be measured in the interior of a cell of the energy supply device. The internal resistance DCR_I can of course also assume intermediate values such as 6.02 milliohms; 7.49 milliohms; 8.33 milliohms; 8.65 milliohms or 9.5 milliohms.

It has been found that, with the internal resistance DCR_I of the at least one cell of less than 10 milliohms, it is possible to provide an energy supply device which has particularly good thermal properties in the sense that it can be operated particularly well at low temperatures, wherein the expenditure on cooling can be kept surprisingly low. In particular, an energy supply device with an internal cell resistance DCR_I of less than 10 milliohms is particularly well suited to supplying electrical power to particularly high-powered power tools. Such energy supply devices can therefore make a valuable contribution to allowing storage-battery-operated power tools to be used even in areas of application that those skilled in the art previously assumed were not open to storage-battery-operated power tools.

Advantageously, such an energy supply device can be used to allow a battery-operated or storage-battery-operated power tool having an energy supply device according to the invention to be supplied with a high level of output power over a long period of time without damaging the surrounding plastics components or the cell chemistry within the cells of the energy supply device.

It is preferred in the context of the invention that a ratio of a resistance of the at least one cell to a surface area A of the at least one cell is less than 0.2 milliohm/cm$^2$, preferably less than 0.1 milliohm/cm$^2$ and most preferably less than 0.05 milliohm/cm$^2$. In the case of a cylindrical cell, the surface of the cell can be formed, for example, by the outer surface of the cylinder as well as the top side and the bottom side of the cell. Furthermore, it can be preferred in the context of the invention for a ratio of a resistance of the at least one cell to a volume V of the at least one cell to be less than 0.4 milliohm/cm$^3$, preferably less than 0.3 milliohm/cm$^3$ and most preferably less than 0.2 milliohm/cm$^3$. For conventional geometric shapes, such as cuboids, cubes, spheres or the like, a person skilled in the art knows the formulae for calculating the surface or the volume of such a geometric body. In the context of the invention, the term "resistance" preferably denotes the internal resistance DCR_I which can preferably be measured in accordance with standard IEC61960. This is preferably a DC resistance.

It is preferred in the context of the invention that the at least one cell has a heating coefficient of less than 1.0 W/(Ah·A), preferably less than 0.75 W/(Ah·A) and particularly preferably less than 0.5 W/(Ah·A). Furthermore, the at least one cell can be designed to output a current of greater than 1000 amperes/liter substantially constantly. The discharge current is indicated in relation to the volume of the at least one cell, wherein the space measurement unit "liter" (l) is used as the unit for the volume. The cells according to the invention are therefore able to output a discharge current of substantially constantly greater than 1000 A per liter of cell volume. In other words, a cell with a volume of 1 liter is able to output a substantially constant discharge current of greater than 1000 A, wherein the at least one cell furthermore has a heating coefficient of less than 1.0 W/(Ah·A). In preferred refinements of the invention, the at least one cell of the energy supply device can have a heating coefficient of less than 0.75 W/(Ah·A), preferably less than 0.5 W/(Ah·A). The unit for the heating coefficient is watts/(ampere hours·amperes). The heating coefficient can of course also have intermediate values, such as 0.56 W/(Ah·A); 0.723 W/(Ah·A) or 0.925 W/(Ah·A).

The invention advantageously allows the provision of an energy supply device having at least one cell which exhibits reduced heating and which is therefore particularly well suited to providing a supply to power tools in which high power levels and high currents, preferably constant currents, are desired for operation. In particular, the invention can be used to provide an energy supply device for a power tool in which the heat which is optionally created during operation of the power tool and when outputting electrical power to the power tool can be dissipated in a particularly simple and uncomplicated manner. Tests have shown that the invention can not only be used to more effectively dissipate existing heat. Rather, the invention prevents heat being generated or the quantity of heat generated during operation of the power tool can be considerably reduced using the invention. The invention can advantageously be used to provide an energy supply device which can supply electrical power in an optimum manner primarily also to power tools which have stringent requirements in respect of power and discharge current. In other words, the invention can provide an energy supply device for particularly powerful power tools with which heavy drilling or demolition work can be performed on construction sites for example.

In the context of the invention, the term "power tool" is to be understood as meaning a typical piece of equipment that can be used on a construction site, for example a building construction site and/or a civil engineering construction site. These may be hammer drills, chisels, core drills, angle or cut-off grinders, cutting devices or the like, without being restricted thereto. In addition, auxiliary devices such as those occasionally used on construction sites, such as lamps, radios, vacuum cleaners, measuring devices, construction robots, wheelbarrows, transport devices, feed devices or other auxiliary devices, can be "power tools" in the context of the invention. The power tool can in particular be a mobile power tool, wherein the energy supply device can in particular also be used in stationary power tools, such as rig-mounted drills or circular saws. However, preference is given to hand-held power tools that are, in particular, operated using a storage battery or battery.

It is preferred in the context of the invention that the at least one cell has a temperature cooling half-life of less than 12 minutes, preferably less than 10 minutes, particularly preferably less than 8 minutes. In the context of the invention, this preferably means that, with free convection, a temperature of the at least one cell is halved in less than 12, 10 or 8 minutes. The temperature cooling half-life is preferably determined in an inoperative state of the energy supply device, that is to say when the energy supply device is not in operation, that is to say is not connected to a power tool. Energy supply devices with temperature cooling half-lives of less than 8 mins have primarily been found to be particularly suitable for use in powerful power tools. The temperature cooling half-life can of course also have a value of 8.5 minutes, 9 minutes 20 seconds or of 11 minutes 47 seconds.

Owing to the surprisingly low temperature cooling half-life of the energy supply device, the heat generated during operation of the power tool or when it is charging remains within the at least one cell only for a short time. In this way, the cell can be recharged particularly quickly and is rapidly available for re-use in the power tool. Moreover, the thermal loading on the components of the energy supply device or the power tool having the energy supply device can be considerably reduced. As a result, the energy supply device can be preserved and its service life extended.

In the context of the invention, it is preferred that the at least one cell is arranged in a battery pack of the energy supply device. A series of individual cells can preferably be combined in the battery pack and in this way inserted into the energy supply device in an optimum manner. For example, 5, 6 or 10 cells may form a battery pack, wherein integer multiples of these numbers are also possible. For example, the energy supply device may have individual cell strings, which may comprise, for example, 5, 6 or 10 cells. An energy supply device having, for example, three strings of five cells each may comprise, for example, 15 individual cells.

In the context of the invention, it is preferred that the energy supply device has a capacity of at least 2.2 Ah, preferably at least 2.5 Ah. Tests have shown that the capacity values mentioned are particularly well suited to the use of high-powered power tools in the construction industry and satisfy the requirements there for the availability of electrical power and the possible service life of the power tool particularly well.

The at least one cell of the energy supply device is preferably configured to output a discharge current of at least 20 A for at least 10 s. For example, a cell of the energy supply device may be designed to provide a discharge current of at least 20 A, in particular at least 25 A, for at least 10 s.

In other words, the at least one cell of an energy supply device can be configured to provide a continuous current of at least 20 A, in particular at least 25 A.

It is also conceivable that peak currents, in particular short-term peak currents, may lead to intense heating of the energy supply device. Therefore an energy supply device with powerful cooling, as can be achieved by the measures described here, is particularly advantageous. It is conceivable, for example, that the at least one cell of the energy supply device can provide at least 50 A for 1 second. In other words, it is preferred in the context of the invention that the at least one cell of the energy supply device is configured to provide a discharge current of at least 50 A for at least 1 s. Power tools can often require high levels of power for short time periods. An energy supply device with cells able to output such a peak current and/or such a continuous current may therefore be particularly suitable for high-powered power tools such as are used on construction sites.

It is preferred in the context of the invention that the at least one cell comprises an electrolyte, wherein the electrolyte is preferably present in a liquid physical state at room temperature. The electrolyte can comprise lithium, sodium and/or magnesium, without being restricted thereto. In particular, the electrolyte may be lithium-based. As an alternative or in addition, said electrolyte can also be sodium-based. It is also conceivable for the rechargeable battery to be magnesium-based. The electrolyte-based energy supply device may have a rated voltage of at least 10 V, preferably at least 18 V, in particular of at least 28 V, for example 36 V. A rated voltage in a range of from 18 to 22 V, in particular in a range of from 21 to 22 V, is very particularly preferred. The at least one cell of the energy supply device can have, for example, a voltage of 3.6 V, without being restricted thereto.

It is preferred in the context of the invention that the energy supply device is charged, for example, at a charging rate of 1.5 C, preferably 2 C, and most preferably 3 C. A charging rate of xC can be understood as meaning the current intensity which is required to fully charge a discharged energy supply device in a fraction of an hour corresponding to the numerical value x of the charging rate x C. For example, a charging rate of 3 C allows the storage battery to be fully charged within 20 minutes.

It is preferred in the context of the invention that the at least one cell of the energy supply device has a surface area A and a volume V, wherein a ratio A/V of surface area to volume is greater than six times, preferably eight times, and particularly preferably ten times, the reciprocal of the cube root of the volume.

The wording that the surface area A of the at least one cell is greater than for example eight times the cube root of the square of the volume V can preferably also be expressed by the formula $A > 8*V^{(2/3)}$. Written another way, this relationship can be described by the fact that the ratio A/V of surface area to volume is greater than eight times the reciprocal of the cube root of the volume.

To check whether the above relation is satisfied, values in the same basic unit must always be used. For example, if a value for the surface area in $m^2$ is substituted into the above formula, a value for the volume in units of $m^3$ is preferably substituted. For example, if a value for the surface area in units of $cm^2$ is substituted into the above formula, a value for the volume in units of $cm^3$ is preferably substituted. For example, if a value for the surface area in units of $mm^2$ is substituted into the above formula, a value for the volume in units of $mm^3$ is preferably substituted.

Cell geometries which, for example, satisfy the relationship $A > 8*V^{(2/3)}$ advantageously have a particularly favorable ratio between the outer surface of the cell, which is critical for the cooling effect, and the cell volume. The inventors have recognized that the ratio of surface area to volume of the at least one cell of the energy supply device has a major influence on the heat dissipation from the energy supply device. The improved cooling capability of the energy supply device can advantageously be achieved by increasing the cell surface area given a constant volume and a low internal resistance of the at least one cell. It is preferred in the context of the invention for a low cell temperature given a simultaneously high power output to preferably be able to be rendered possible when the internal resistance of the cell is reduced. Reducing the internal resistance of the at least one cell can result in less heat being generated. In addition, a low cell temperature can be achieved by using cells in which the surface area A of at least one cell within the energy supply device is greater than six times, preferably eight times, and particularly preferably ten times, the cube root of the square of the volume V of the at least one cell. It is thus possible in particular for the release of heat to the surroundings to be improved.

It has been found that energy supply devices whose cells satisfy the stated relationship can be cooled significantly more effectively than previously known energy supply devices having, for example, cylindrical cells. The above relationship can be satisfied, for example, by virtue of the fact that, although the cells of the energy supply device have a cylindrical basic shape, additional surface-area-enlarging elements are arranged on the surface thereof. Said elements can be, for example, fins, teeth or the like. Cells which do not have a cylindrical basic shape, but rather are shaped entirely differently, can also be used within the scope of the invention. For example, the cells of the energy supply device can have a substantially cuboidal or cube-like basic shape. The term "substantially" is not unclear to a person skilled in the art here because a person skilled in the art knows that, for example, a cuboid with indentations or rounded corners and/or edges should also be covered by the term "substantially cuboidal" in the context of the present invention.

It is preferred in the context of the invention for the at least one cell to have a cell core, wherein no point within the cell core is more than 5 mm away from a surface of the energy supply device. When the energy supply device is discharged, for example when it is connected to a power tool and work is performed with the power tool, heat can be produced in the cell core. In this specific refinement of the invention, this heat can be transported on a comparatively short path as far as the surface of the cell of the energy supply device. The heat can be dissipated in an optimum manner from the surface. Therefore, such an energy supply device can exhibit good cooling, in particular comparatively good self-cooling. The time period until the limit temperature is reached can be extended and/or the situation of the limit temperature being reached can advantageously be entirely avoided. As a further advantage of the invention, a relatively homogeneous temperature distribution can be achieved within the cell core. This can result in uniform aging of the rechargeable battery. This can in turn increase the service life of the energy supply device.

It is preferred in the context of the invention for the at least one cell to have a maximum constant current output of greater than 20 amperes, preferably greater than 30 amperes, most preferably greater than 40 amperes. The maximum constant current output is the quantity of current in a cell or an energy supply device that can be drawn without the cell or the energy supply device reaching an upper temperature limit. Possible upper temperature limits can lie in a region of 60° C. or 70° C., without being restricted thereto. The unit for the maximum constant current output is amperes.

All intermediate values should also always be considered to be disclosed in the case of all the value ranges that are mentioned in the context of the present invention. For example, values of between 20 and 30 A, that is to say 21, 22.3, 24, 25.55 or 27.06 amperes etc. for example, should also be considered to be disclosed in the case of the maximum constant current output. Furthermore, values of between 30 and 40 A, that is to say 32, 33.3, 36, 38.55 or 39.07 amperes etc. for example, should also be considered to be disclosed.

It is preferred in the context of the invention for the energy supply device to have a discharge C rate of greater than $80 \cdot \hat{t}(-0.45)$, where the letter "t" stands for time in the unit seconds. The C rate advantageously allows quantification of the charging and discharge currents for energy supply devices, wherein the discharge C rate used here renders possible, in particular, the quantification of the discharge currents of energy supply devices. For example, the maximum permissible charging and discharge currents can be indicated by the C rate. These charging and discharge currents preferably depend on the rated capacity of the energy supply device. The unusually high discharge C rate of $80 \cdot \hat{t}(-0.45)$ advantageously means that the energy supply device can be used to achieve particularly high discharge currents which are required for operating powerful power tools in the construction industry. For example, the discharge currents can lie in a region of greater than 40 amperes, preferably greater than 60 amperes or even more preferably greater than 80 amperes.

In the context of the invention, it is preferred for the cell to have a cell temperature gradient of less than 10 kelvin. The cell temperature gradient is preferably a measure of temperature differences within the at least one cell of the energy supply device, wherein it is preferred in the context of the invention for the cell to have a temperature distribution that is as uniform as possible, that is to say for a temperature in an inner region of the cell to differ as little as possible from a temperature which is measured in the region of a lateral or outer surface of the cell.

It is preferred in the context of the invention that an energy supply device with the properties mentioned represents a powerful energy supply device, such as is referred to in the context of the present invention, for example, as an energy supply device of the first type. Such energy supply devices are preferably set up to supply particularly powerful power tools with electrical power. The energy supply devices with the features mentioned preferably represent energy supply devices which can be regarded as representatives of future cell technologies.

BRIEF DESCRIPTION OF THE DRAWINGS

Further advantages will become apparent from the following description of the figures. The figures, the description and the claims contain numerous features in combination. A person skilled in the art will expediently also consider the features individually and combine them to form useful further combinations.

Identical and similar components are denoted by the same reference signs in the figures.

In the drawing:

FIG. 1 shows a view of a preferred refinement of the system

Figure 2:
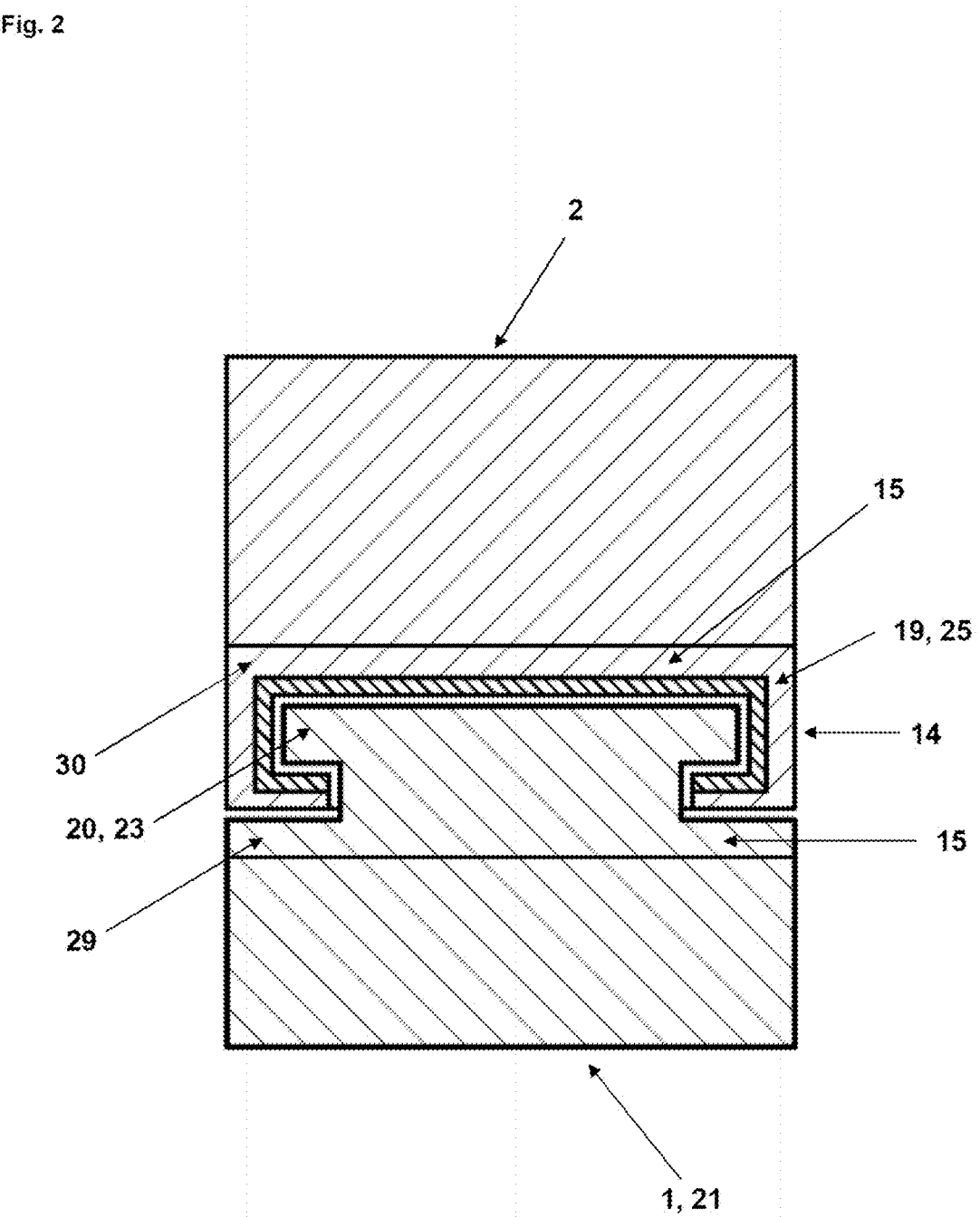
Figure 3:
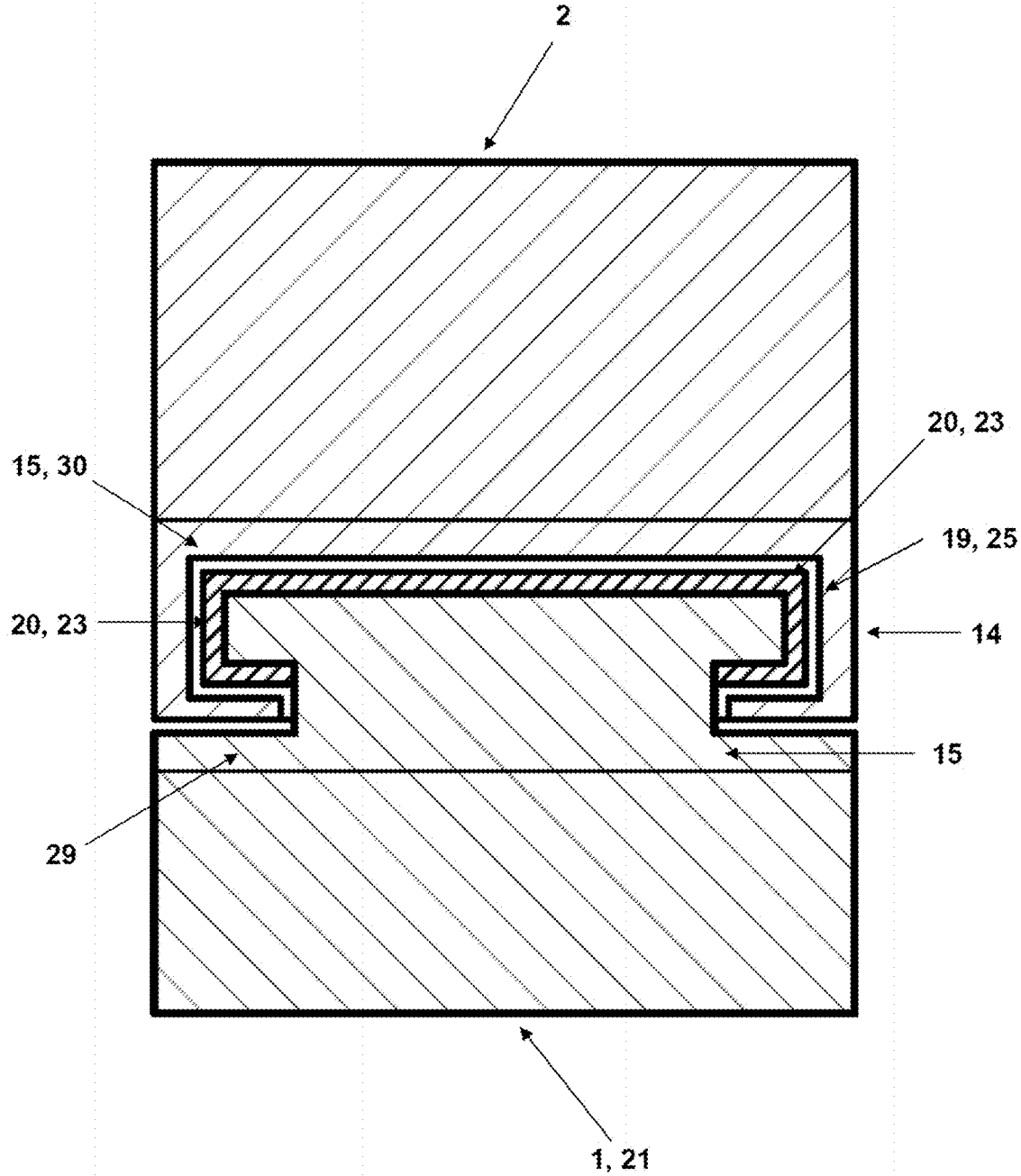
Figure 4:
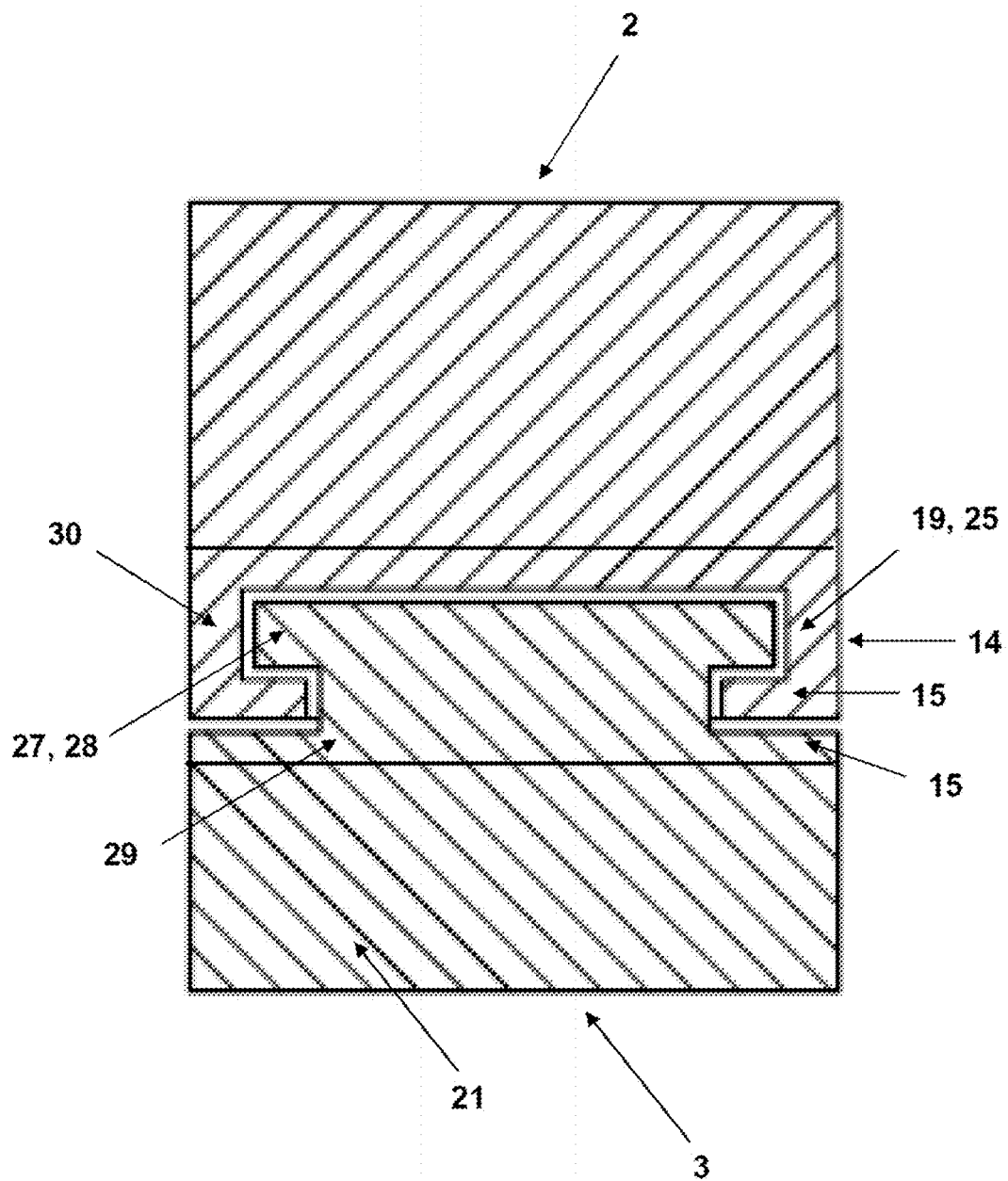
Figure 5:
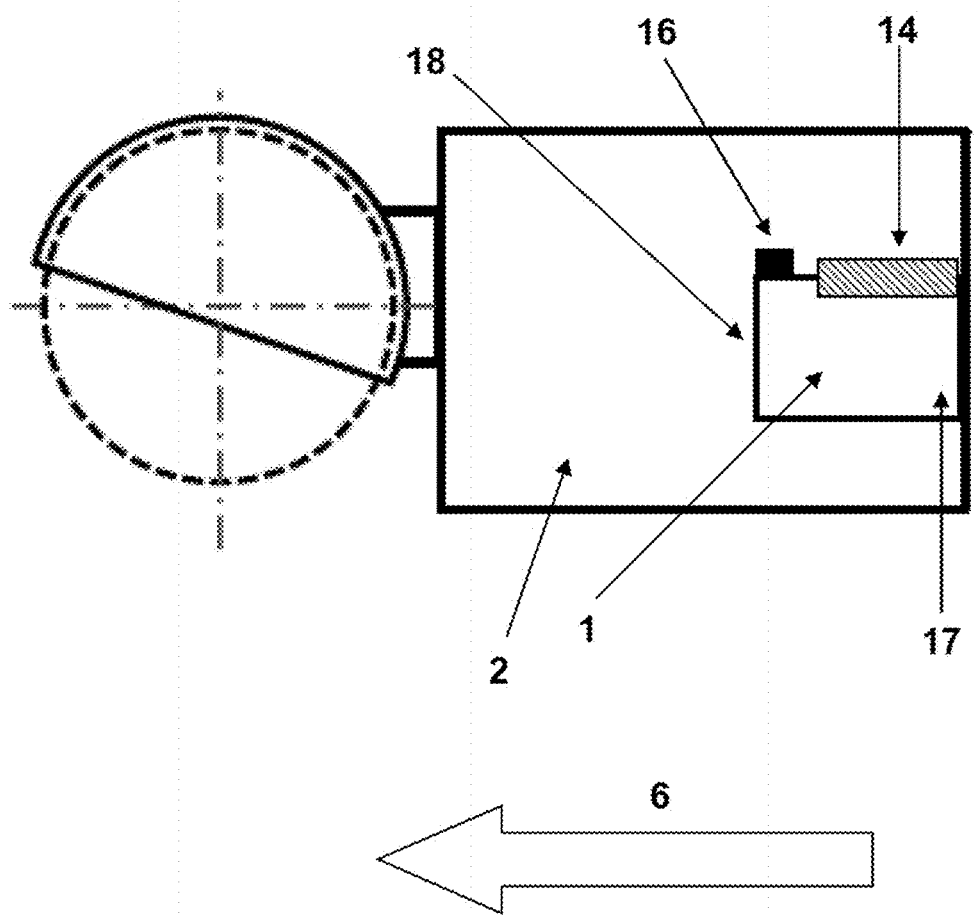
Figure 6:
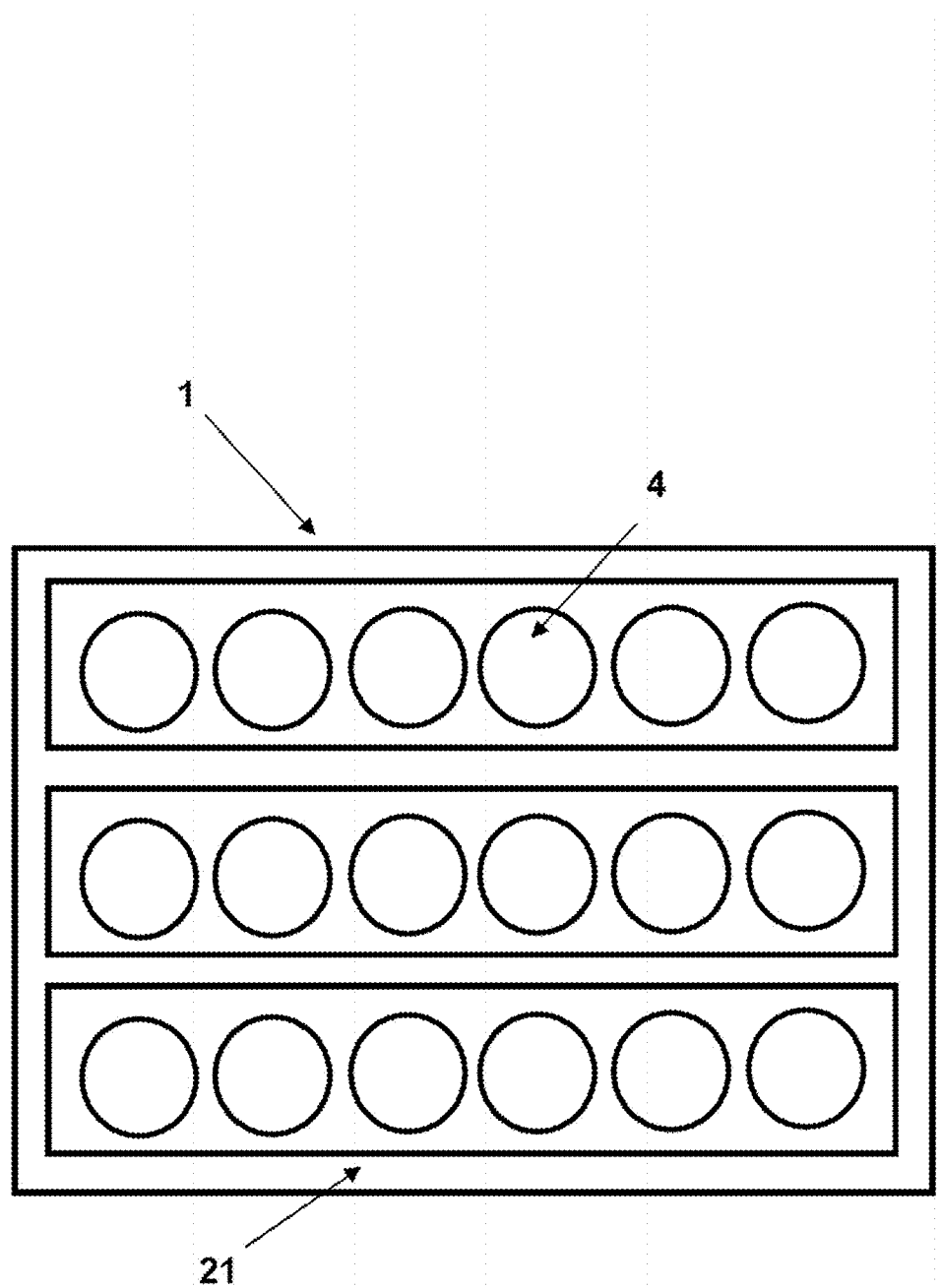
Figure 7:
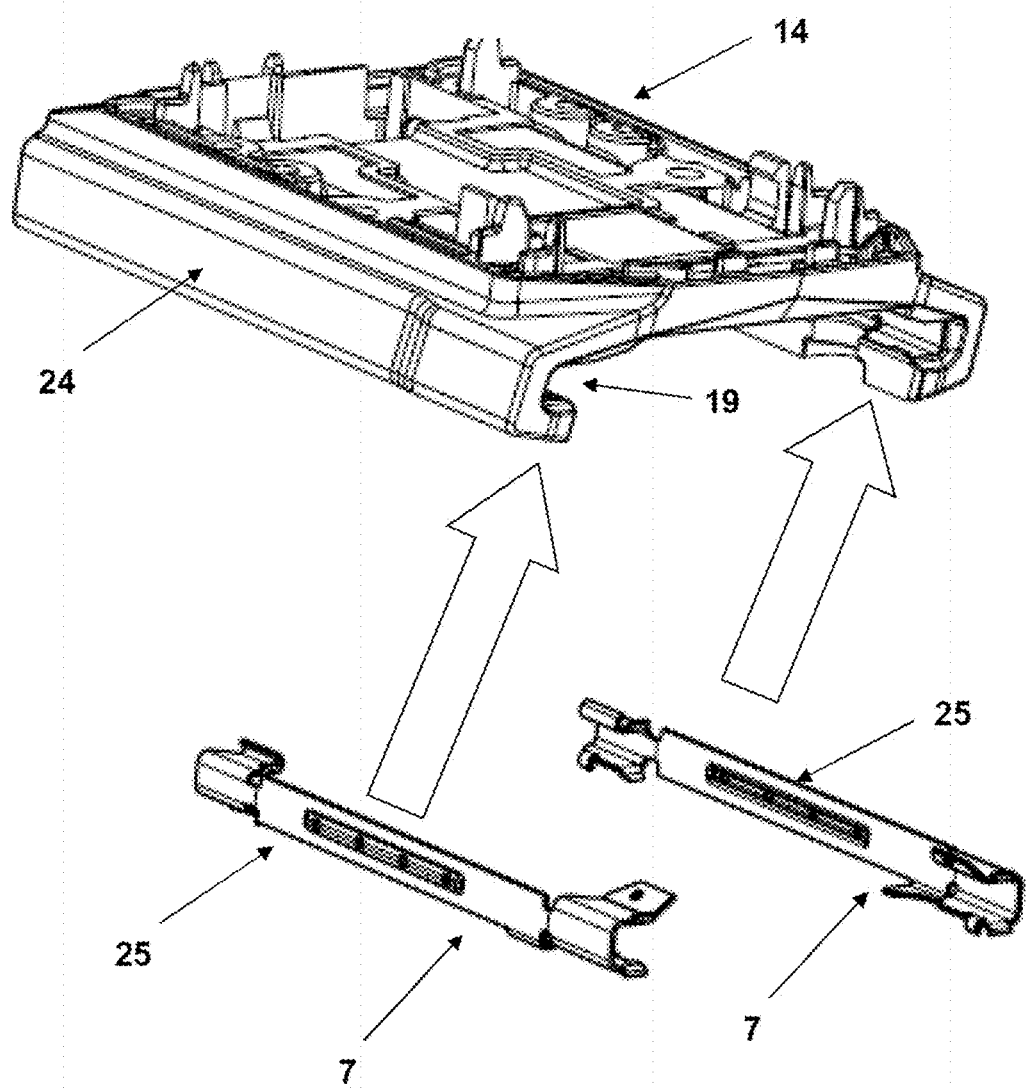

FIG. 2 shows a schematic sectional representation through a power tool and an energy supply device FIG. 3 shows a further schematic sectional representation through a power tool and an energy supply device of the first type FIG. 4 shows a schematic sectional representation through a power tool and an energy supply device of the second type FIG. 5 shows a schematic representation of a preferred refinement of the system FIG. 6 shows a schematic sectional representation of a preferred refinement of the energy supply device FIG. 7 shows a view of a preferred refinement of the interface in the region of the power tool

DETAILED DESCRIPTION

Figure 1:
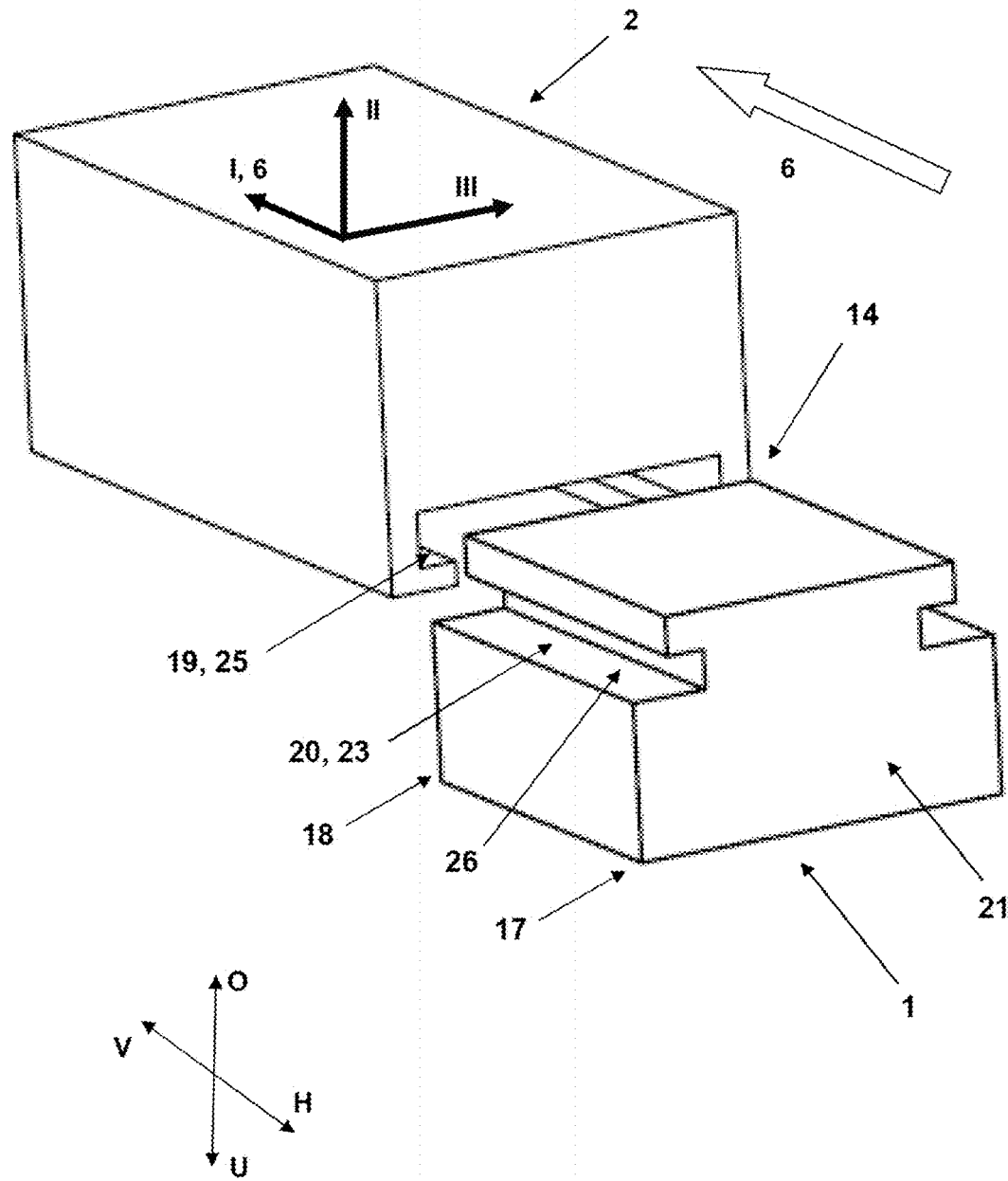

FIG. 1 shows a view of a preferred embodiment of the system 100. The figure shows an energy supply device 1 which can be introduced into a power tool 2 in order to supply the power tool 2 with electrical power. The energy supply device 1 can, for example, be introduced into a cavity of the power tool 2 or into a receiving slot of the power tool 2, as shown in FIG. 1. The energy supply device 1 can comprise a battery pack 21 in which energy storage cells 4 (see FIG. 6) can be contained. In the upper region of the energy supply device 1 there can be arranged the part-region of the interface 14 that belongs to the energy supply device 1. The part-region of the interface 14 that belongs to the energy supply device 1 can comprise the first contact region 20, which in turn comprises the first contact material 23. The part-region of the interface 14 that belongs to the energy supply device 1 can additionally comprise guide surfaces 26, wherein the guide surfaces 26 can be formed or oriented both horizontally and. The interface 14 preferably forms a linear guide, which can substantially facilitate insertion of the energy supply device 1 into the power tool 2.

The power tool 2 preferably has a part-region of the interface 14 that belongs to the power tool 2. This part-region of the interface 14 that belongs to the power tool 2 can be designed as a receiving device for receiving the part-region of the interface 14 that belongs to the energy supply device 1. It is preferred in the context of the invention that the part-regions of the interface 14 are designed to correspond in the sense that the energy supply device 1 can be introduced into the power tool 2 in order subsequently to be fastened there and to supply the power tool 2 with electrical power. The insertion direction 6 along which the energy supply device 1 can be inserted into the power tool 2 is represented in FIG. 1 by an arrow. For this purpose, the energy supply device 1 can be introduced into a cavity of the power tool 2. The energy supply device 1 is introduced into the power tool 2 along an insertion direction 6 which preferably coincides with a first axis I of a virtual coordinate system which is used to describe the invention. The virtual coordinate system also includes a second axis II and a third axis III.

In particular, the part-region of the interface 14 that belongs to the power tool 2 comprises the second contact region 19, which comprises the second contact material 25.

In order to connect the energy supply device 1 to the power tool 2, the energy supply device 1 has an interface 14, which preferably represents a mechanical interface. The interface 14 shown in FIG. 1 is present on a top side of the energy supply device 1. In a front region 18 of the energy supply device 1, the energy supply device 1 has a data and/or power interface 16 (cf. FIG. 5), which can be used to exchange data between the energy supply device 1 and the power tool 2 in the connected state or to transfer electrical power from the energy supply device 1 in the direction of the power tool 2. In a rear region 17, the energy supply device 1 can have a locking mechanism for fastening the energy supply device 1 in the power tool 2. The energy supply device 1 can comprise a battery pack 21, which forms the lower region of the energy supply device 1.

The interface 14 is designed in such a way that the interface 14 allows a relative movement of the power tool 2 and the energy supply device 1 in an insertion direction 6, wherein, in an inserted state, the first contact region 20 is in contact with the second contact region 19 in such a way that a relative movement between the power tool 2 and the energy supply device 1 in the other spatial directions is prevented. The energy supply device 1 can thus be held particularly securely and stably in the power tool 2, even when vibrations and shocks occur.

The insertion direction 6 preferably coincides with a first spatial axis I of a virtual coordinate system which is used to describe the invention, while the other spatial directions correspond to the spatial directions II and III of the virtual coordinate system. The virtual coordinate system is likewise shown in FIG. 1, as is a direction arrow which indicates the spatial directions "forward V", "rearward H", "upward O" and "downward U" and denotes them with the corresponding letters: V, H, O and U.

The part-region of the interface 14 that belongs to the power tool 2 the second contact region 19, which comprises the second contact material 25. On the power tool 2 there is arranged a second contact region 19 which has a second contact material 25, wherein at least one of the contact materials 23, 25 has a second density which is greater than a first density of the base material 15. Both the energy supply device 1 and the power tool 2 can preferably comprise a base material 15, which may be, for example, a plastics material. The energy supply device 1 and the power tool 2 can be referred to as connecting partners of the interface 14, wherein the energy supply device 1 and the power tool 2 can comprise the base material 15 at least in some portions in the region of the interface 14. At least one of the contact regions 19, 20 of the interface 14 additionally comprises a contact material 23, 25 with a second density, wherein the contact material 23, 25 with the second density is preferably particularly wear-resistant and hard-wearing. The contact material 23, 25 with a second density can be inserted in the form of insert parts or inserts into depressions in the base material 15. However, it may also be preferred that the individual surfaces of the contact regions 19, 20 are coated wholly or partially with the contact material 23, 25 of the second density, or that the contact region 19, 20 is lined with sheets of the contact material 23, 25 with the second density. The contact material 23, 25 with a second density can be present either in one of the contact regions 19, 20 or in both contact regions 19, 20.

FIG. 2 shows a schematic sectional representation through the power tool 2 and the energy supply device 1, wherein there is shown in particular an exemplary embodiment of the invention in which the second contact region 19 of the power tool 2 comprises the contact material 25 with a second density. In other words, the second contact region 19 of the power tool 2 is coated, covered or lined with the second contact material 25, which has a second density and is particularly wear-resistant.

In FIG. 2-4, the first interface body 29 and the second interface body 30 are also depicted. The first interface body 29 is preferably arranged on the energy supply device 1, while the second interface body 30 is preferably arranged on the power tool 2. The interface bodies 29, 30 constitute the spatial regions of the energy supply device 1 and of the power tool 2 that form the interface 14. In relation to the energy supply device 1, the interface body may be, for example, a plastic plate which may be arranged, for example, on the top side of the battery pack 21. In relation to the power tool 2, the interface body may be, for example, the receiving region, which can form the contact region 19 of the power tool 2. It is preferred in the context of the invention that the interface bodies 29, 30 comprise the base material 15 or are formed therefrom. In FIG. 2, the contact region 19 of the power tool 2 has the contact material 25 with the second density, so that the part-region of the interface 14 that belongs to the power tool 2 is formed preferably of at least two materials, namely the base material 15 with a first density and the contact material 25 with a second density which is preferably greater than the first density. The base material 15 of the second interface body 30 can, for example, be covered, coated or lined with the second contact material 25 with the second density.

FIG. 3 shows a schematic sectional representation through the power tool 2 and the energy supply device 1, wherein there is shown in particular an exemplary embodiment of the invention in which the first contact region 20 of the energy supply device 1 comprises the contact material 23 with a second density. In other words, the first contact region 20 of the energy supply device 1 is coated, covered or lined with the first contact material 23, which has a second density and is particularly wear-resistant. FIG. 3 shows in particular a power tool 2 and an energy supply device 1 of the first type, in which the contact material 23 with a second density is arranged on the energy supply device 1.

In FIG. 3, the first contact region 20 of the energy supply device 1 has the contact material 23 with the second density, so that the part-region of the interface 14 that belongs to the energy supply device 1 is formed preferably of at least two materials, namely the base material 15 with a first density and the contact material 22 with a second density, which is preferably greater than the first density. The base material 15 of the first interface body 30 can, for example, be covered, coated or lined with the first contact material 23 with the second density.

FIG. 4 shows a schematic sectional representation through a tool machine 2 and an energy supply device 3 of the second type. The second energy supply device 3 also has an interface body 29 which comprises a base material 15 or is formed therefrom. The interface body 29 comprises the third contact region 27 of the energy supply device 3, wherein the third contact region 27 comprises the contact material 28. The contact material 28 can correspond to the base material 15 and have a substantially identical or similar density, which preferably corresponds to the first density. In particular, FIG. 4 shows a combination of a power tool 2 with an energy supply device 3 of the second type, which together with an energy supply device 1 of the second type can form a system for supplying a power tool with electrical power. The power tool 2 can thereby be supplied with electrical power by energy supply devices 1, 3, wherein the energy supply devices 1, 3 differ in particular in the contact material 23, 28 that is used, which forms the respective contact region 20, 27. The voltage of the energy supply devices 1, 3 is preferably substantially the same in all the energy supply devices 1, 3 of the system 100; it may lie, for example, in a region of from 10 to 30 V, preferably from 15 to 25 V, particularly preferably from 18 to 22 V. The system 100 advantageously forms an energy supply platform for power tools 2, in which the power tool 2 can be supplied with electrical power by energy supply devices 1, 3 of different designs.

FIG. 5 shows a view of a preferred refinement of a power tool 2. The power tool 2 can in conventional manner include a tool, operating elements and/or handles. The power tool 2 can in particular also have a motor. The power tool 2 can be connected to an energy supply device 1 ("connected state") to enable the energy supply device 1 to supply the power tool 2 with electrical power. The energy supply device 1 can have an interface 14 which can interact with a power tool 2. The energy supply device 1 has a data and/or power interface 16 on its top side. The data and/or power interface 16 can be arranged in a front region 18 of the energy supply device 1, while the locking mechanism is arranged in a rear region 17 of the energy supply device 1.

FIG. 6 shows a schematic side view of a preferred refinement of the energy supply device 1. The energy supply device 1 shown in FIG. 6 has eighteen cells 4, wherein the eighteen cells 4 are arranged in three strings within the energy supply device 1. In particular, the cells 4 are symbolized by the circles, while the strings are symbolized by the elongate rectangles surrounding the circles ("cells 4").

FIG. 7 shows a preferred refinement of the interface 14 in the region of the power tool 2 (see, e.g, FIG. 5). In the top region of FIG. 7 there is illustrated an interface region of the power tool 2, which is preferably configured as a receiving device 24 for receiving the contact region 20 of an energy supply device 1 (see, e.g, FIG. 6). In the bottom region of FIG. 7, insert parts or inserts 7 are illustrated, which can be integrated in the contact region 19 of the power tool 2. For example, the insert parts or inserts 7 can be introduced into the receiving device 24 of the power tool 2 by an injection molding process, in order to increase the durability and the robustness of the interface 14. The insert parts or inserts 7 can preferably comprise a contact material 25 with a second density and can be designed to be particularly wear-resistant. The insert parts or inserts 7 can preferably be made wholly or partially of a metal or a metal alloy. The inserts parts or inserts 7 advantageously reinforce the contact region 19 of the power tool 2, so that the interface 14 is able to meet the high mechanical and electrical requirements of future battery technologies. The insert parts or inserts 7 may of course also be provided in the contact regions 20, 27 of the energy supply devices 1, 3. For a particularly durable interface 14, both the power tool 2 and the energy supply device 1, 3 can have a contact material 23, 25 of a second density (see e.g., FIGS. 3 and 4).

LIST OF REFERENCE SIGNS

1 First energy supply device
2 Power tool
3 Second energy supply device
4 Cell of an energy supply device
6 Insertion direction
7 Inserts or insert parts
14 Interface of the energy supply device
15 Base material
16 Data and power interface
17 Rear region of the energy supply device
18 Front region of the energy supply device
19 Second contact region
20 First contact region
21 Battery pack
23 First contact material
24 Receiving device
25 Second contact material
26 Guide surface
27 Third contact region
28 Third contact material
29 First interface body
30 Second interface body
O Spatial direction "upward"
U Spatial direction "downward"
V Spatial direction "forward"
H Spatial direction "rearward"
I Axis 1 of the virtual coordinate system, "first spatial axis"
II Axis 2 of the virtual coordinate system, "second spatial axis", one of the other spatial directions
III Axis 3 of the virtual coordinate system, "third spatial axis", one of the other spatial directions

What is claimed is:

1. A system comprising:
a power tool; and
an energy supply for supplying the power tool with electrical energy, the energy supply releasably connectable to the power tool via an interface, the interface including a base material with a first density and designed in such a way that the interface allows a relative movement of the power tool and the energy supply device in an insertion direction,
the energy supply device having a first contact region with a first contact material and the power tool having a second contact region with a second contact material, wherein, in an inserted state, the first contact region is in contact with the second contact region in such a way that a relative movement between the power tool and the energy supply device in the other spatial directions is prevented, wherein the first contact material or the second contact material have a second density greater than the first density,
wherein the second density lies in a region of greater than 3.0 g/cm$^3$.

2. The system as recited in claim 1 wherein the second density lies in a region of greater than 4 g/cm$^3$.

3. The system as recited in claim 1 wherein the first density lies in a region of less than 3.0 g/cm$^3$.

4. The system as recited in claim 3 wherein the first density lies in a region of less than 2 g/cm$^3$.

5. The system as recited in claim 1 wherein a surface hardness of the first or second contact material having the second density lies in a region of greater than 90 HV.

6. The system as recited in claim 5 wherein the surface hardness lies in a region of greater than 100 HV.

7. The system as recited in claim 1 wherein the first or second contact material having the second density is a metal, a metal alloy or a metal coating.

8. The system as recited in claim 1 wherein the first or second contact material having the second density has a PREN value of greater than 10.

9. The system as recited in claim 8 wherein the PREN value is greater than 13.

10. The system as recited in claim 9 wherein the PREN value is greater than 15.

11. The system as recited in claim 1 further comprising a second energy supply device, wherein the power tool is detachably connectable both to the first energy supply device and to the second energy supply device via the interface in order to receive electrical power, wherein the second energy supply device has a third contact region with a third contact material, wherein, in an inserted state, the third contact region is in contact with the second contact region in such a way that a relative movement between the power tool and the energy supply device in the other spatial directions is prevented, wherein the third contact material has the first density.

12. A power tool for use in the system as recited in claim 1, the power tool comprising:
the second contact region, wherein the second contact region has the second contact material with the second density, wherein the second contact region is configured to allow relative movement of the power tool and the energy supply device in the insertion direction and to prevent the relative movement between the power tool and the energy supply device in the other spatial directions.

13. An energy supply device for use in the system as recited in claim 1, the energy supply device comprising:
the first contact region, wherein the first contact region has the first contact material with the second density, wherein the first contact region is configured to allow relative movement of the power tool and the energy supply device in the insertion direction and to prevent the relative movement between the power tool and the energy supply device in the other spatial directions.

14. The energy supply device as recited in claim 13 further comprising at least one cell having an internal resistance DCR_I of less than 10 milliohms.

15. The energy supply device as recited in claim 13 further comprising at least one cell, wherein the at least cell has a surface area A and a volume V, wherein a ratio A/V of the surface area to the volume is greater than six times the inverse of the cube root of the volume.

16. The energy supply device as recited in claim 15 wherein the ratio A/V is greater than eight times the inverse of the cube root of the volume.

17. The energy supply device as recited in claim 16 wherein the ratio A/V is greater than ten times the inverse of the cube root of the volume.

18. The energy supply device as recited in claim 13 further comprising at least one cell, a ratio of a resistance of the at least one cell to a surface area A of the at least one cell being less than 0.2 milliohm/cm$^2$.

19. The energy supply device as recited in claim 18 wherein the ratio of the resistance is less than 0.1 milliohm/cm$^2$, most preferably less than 0.05 milliohm/cm$^2$.

20. The energy supply device as recited in claim 19 wherein the ratio of the resistance is less than 0.05 milliohm/cm$^2$.

21. A system comprising:
a power tool; and
an energy supply for supplying the power tool with electrical energy, the energy supply releasably connectable to the power tool via an interface, the interface including a base material with a first density and designed in such a way that the interface allows a relative movement of the power tool and the energy supply device in an insertion direction,
the energy supply device having a first contact region with a first contact material and the power tool having a second contact region with a second contact material, wherein, in an inserted state, the first contact region is in contact with the second contact region in such a way that a relative movement between the power tool and the energy supply device in the other spatial directions is prevented, wherein the first contact material or the second contact material have a second density greater than the first density,
wherein the first or second contact material having the second density accounts for a proportion of greater than 5% of a guide surface between the power tool and the energy supply device.

22. A system comprising:
a power tool; and
an energy supply for supplying the power tool with electrical energy, the energy supply releasably connectable to the power tool via an interface, the interface including a base material with a first density and designed in such a way that the interface allows a relative movement of the power tool and the energy supply device in an insertion direction,
the energy supply device having a first contact region with a first contact material and the power tool having a second contact region with a second contact material, wherein, in an inserted state, the first contact region is in contact with the second contact region in such a way that a relative movement between the power tool and the energy supply device in the other spatial directions is prevented, wherein the first contact material or the second contact material have a second density greater than the first density,
wherein the energy supply device has a first interface body and the power tool has a second interface body, wherein a proportion of the first or second contact material having the second density in the first interface body or in the second interface body is less than 10%.

* * * * *